United States Patent
Li

(10) Patent No.: US 8,730,856 B2
(45) Date of Patent: May 20, 2014

(54) WIRELESS COMMUNICATION SYSTEM, MOBILE COMMUNICATION APPARATUS, AND OPERATING METHOD THEREOF

(75) Inventor: Cheng-Yen Li, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 1034 days.

(21) Appl. No.: 12/728,019

(22) Filed: Mar. 19, 2010

(65) Prior Publication Data

US 2010/0329164 A1   Dec. 30, 2010

(30) Foreign Application Priority Data

Jun. 24, 2009   (TW) .................................. 98121180 A

(51) Int. Cl.
*H04W 52/02*   (2009.01)

(52) U.S. Cl.
USPC ............................. 370/311; 370/338; 455/458

(58) Field of Classification Search
None
See application file for complete search history.

(56) References Cited

U.S. PATENT DOCUMENTS

| | | | |
|---|---|---|---|
| 7,349,355 B2 * | 3/2008 | Sengupta et al. | 370/311 |
| 7,428,571 B2 * | 9/2008 | Ichimura | 709/203 |
| 2007/0218926 A1 * | 9/2007 | Zhuang et al. | 455/466 |
| 2010/0203905 A1 * | 8/2010 | Chaubey et al. | 455/458 |

FOREIGN PATENT DOCUMENTS

| | | |
|---|---|---|
| TW | I305456 | 1/2009 |
| TW | 200910809 | 3/2009 |

\* cited by examiner

*Primary Examiner* — Alex Skripnikov
(74) *Attorney, Agent, or Firm* — Han IP Corporation

(57) ABSTRACT

A wireless communication system is provided. The wireless communication system comprises a control apparatus, a first mobile communication apparatus and a second mobile communication apparatus. The first and second mobile communication apparatuses are within a wireless communication coverage of the control apparatus. The first mobile communication apparatus is in a standby period under an idle mode according to a wireless communication protocol; the second mobile communication apparatus is in an active period under the idle mode according to the wireless communication protocol and establishes a communication link with the control apparatus. The first mobile communication apparatus communicates with the control apparatus through the second mobile communication apparatus via a peer-to-peer (P2P) communication mechanism.

17 Claims, 8 Drawing Sheets

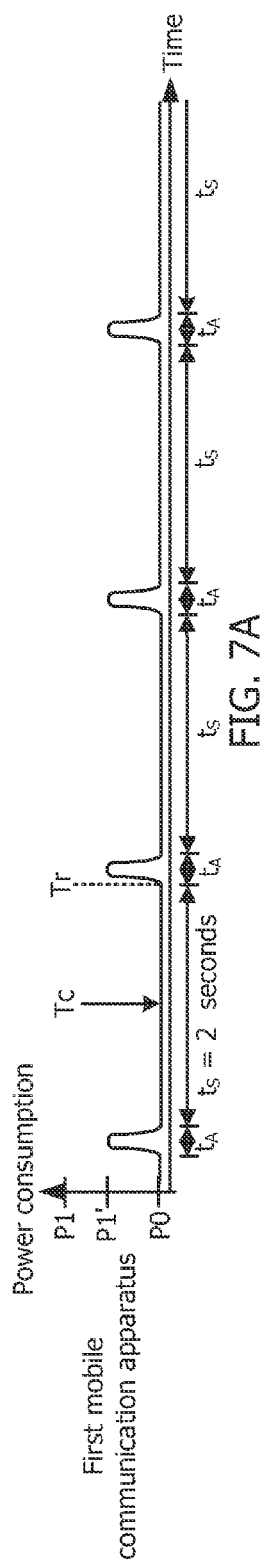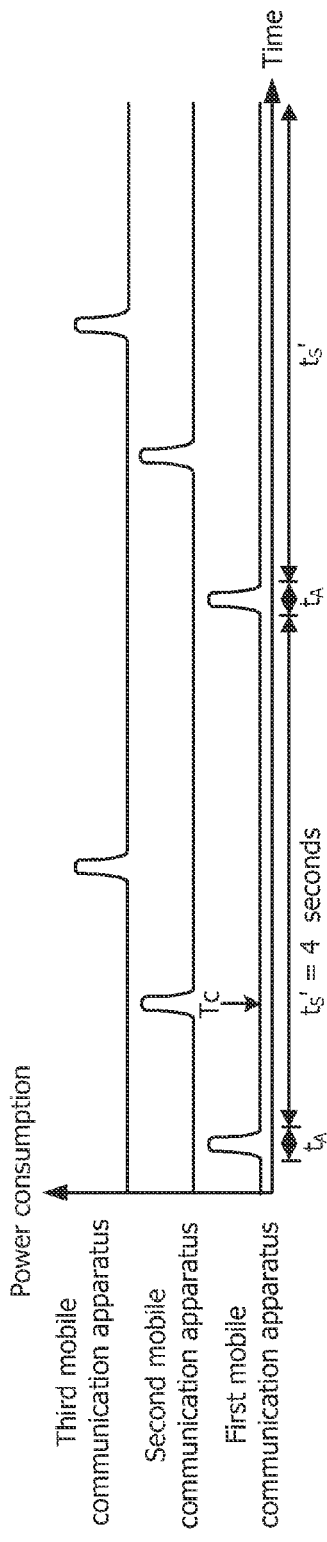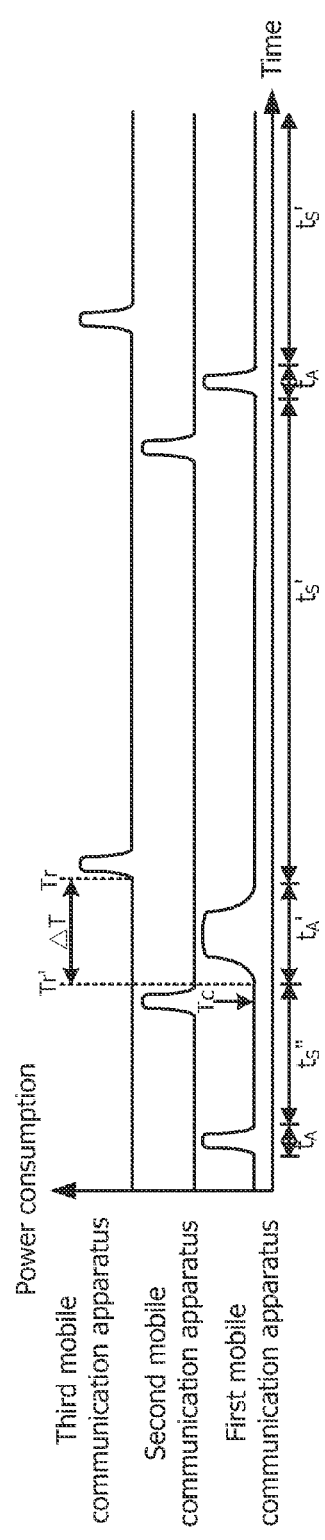

WIRELESS COMMUNICATION SYSTEM, MOBILE COMMUNICATION APPARATUS, AND OPERATING METHOD THEREOF

CROSS REFERENCE TO RELATED PATENT APPLICATION

This patent application claims priority from Taiwan Patent Application No. 098121180, filed in the Taiwan Patent Office on Jun. 24, 2009, entitled "Wireless Communication System, Mobile Communication Apparatus, and Operating Method Thereof", and incorporates the Taiwan patent application in its entirety by reference.

TECHNICAL FIELD

The present disclosure relates to wireless communication, and more particularly, to a wireless communication system that, by implementing a peer-to-peer (P2P) mechanism among a plurality of mobile communication apparatuses, effectively reduces power consumption of a mobile communication apparatus under an idle mode as well as lengthening a total standby time of the mobile communication apparatus.

BACKGROUND OF THE DISCLOSURE

Accompanied with the blooming development of wireless communication technologies, various mobile communication apparatuses, e.g., mobile phones and personal digital assistants (PDAs), with all sorts of functions, have become indispensable tools in the daily life of the modern people.

Since a mobile communication apparatus has an advantage of being readily portable, the length of its total standby time is naturally an issue that a user pays much attention to. Most mobile communication apparatuses are defined with an idle mode, or also commonly referred to as a waiting mode, under which a mobile communication apparatus activates a communication with a base station at a predetermined interval (e.g., 470.73 ms on GSM DRX2) when the mobile communication apparatus is not in use by the user for mobile communication. Under such an idle mode, the foregoing interval is defined as a standby period, and an active time when communicating with the base station is defined as an active period.

FIG. 1 shows a schematic diagram illustrating a relationship between time and power consumption of a conventional mobile communication apparatus under an idle mode. As shown, when the mobile communication apparatus is under an idle mode, it only activates a communication with a base station at an interval of hundreds of milliseconds to several seconds, i.e., standby period $t_2$, depending on the carrier's specifications, while an active period $t_1$ of the mobile communication apparatus is extremely short at only approximately several milliseconds. Via the short communication period, the mobile communication apparatus calibrates time and frequency with the base station, adjusts power at transmitting and receiving terminals, determines whether to proceed with the hand-over with the base station, and checks whether there are incoming calls. When check results show that the base station receives no incoming calls intended for the mobile communication apparatus, the mobile communication apparatus terminates the communication with the base station and re-enters the standby period $t_2$. As observed from the diagram, it is apparent that a power consumption peak P1 within the active period $t_1$ reaches as high as hundreds of mA or tens of mA. In contrast, during the standby period $t_2$, a power consumption P0 is quite low as being several mA or hundreds of μA since the mobile communication apparatus only needs to keep a timing controller activated for counting while other components may be temporarily turned off.

It is to be noted that a common user is unlikely to spend much time on talking on the mobile communication apparatus, and thus the time that the mobile communication apparatus operates under the idle mode is relatively high in ratio. Therefore, a total standby time of the mobile communication apparatus can be prolonged when power consumption of the mobile communication apparatus during the standby period is lowered. In addition, for the reason that the power consumption peak P1 within the active period $t_1$ is far higher than the power consumption P0 during the standby period $t_2$, the total standby time of the mobile communication apparatus can be further lengthened if the total power consumption during the active period $t_1$ of the mobile communication apparatus is reduced.

With reference to FIG. 2 and FIG. 3, common approaches for reducing the total power consumption during the active period $t_1$ of the mobile communication apparatus are to shorten the active period $t_1$ to $t_1'$, or to lower the power consumption peak P1 during the active period $t_1$ to P1'. However, outcomes yielded by such approaches are still unsatisfactory. By taking alternatives into consideration, supposing an approach of directly omitting the active period $t_1$ is adopted, the mobile communication apparatus has no means of learning whether there are incoming calls; supposing an approach of simply extending the standby period $t_2$ is adopted, the mobile communication apparatus shall be delayed in being informed about incoming calls and hence a caller shall also wait for a longer period before the call is connected through—these alternatives can hardly be accounted as appropriate solutions.

Therefore, it is an objective of the present disclosure to provide a wireless communication system, a mobile communication apparatus and an operating method thereof to address the abovementioned shortcomings associated with the conventional solutions.

SUMMARY OF THE DISCLOSURE

The present disclosure provides a wireless communication system comprising a control apparatus, a first mobile communication apparatus and a second mobile communication apparatus. The first and second communication apparatuses are within a wireless communication coverage of the control apparatus. The first mobile communication apparatus is in a standby period under an idle mode compliant with a wireless communication protocol, and the second mobile communication apparatus is in an active period under an idle mode to establish a communication link with the control apparatus. The first mobile communication apparatus communicates through the control apparatus with the second mobile communication apparatus via a peer-to-peer (P2P) communication mechanism.

The present disclosure further provides a method for operating a wireless communication system comprising a control apparatus, a first mobile communication apparatus and a second mobile communication apparatus. The first and second communication apparatuses are within a wireless communication coverage of the control apparatus. According to the method, the first mobile communication apparatus is in a standby period under an idle mode compliant with a wireless communication protocol, and the second mobile communication apparatus is in an active period under an idle mode to establish a communication link with the control apparatus. The first mobile communication apparatus communicates through the control apparatus with the second mobile communication apparatus via a peer-to-peer (P2P) communication mechanism.

The present disclosure further provides a first mobile communication apparatus. The first mobile communication apparatus is within a wireless communication coverage of a control apparatus of a wireless communication system, and is in a standby period under an idle mode compliant with a wireless communication protocol. A second mobile communication apparatus also located within the wireless communication coverage is in an active period under an idle mode compliant with the wireless communication protocol to establish a communication link with the control apparatus. The first mobile communication apparatus comprises a P2P transceiving module, which communicates through the second mobile communication apparatus with the control apparatus via a P2P communication mechanism.

The present disclosure further provides yet another first mobile communication apparatus. The first mobile communication apparatus is within a wireless communication coverage of a control apparatus of a wireless communication system, and is in an active period under an idle mode compliant with a wireless communication protocol. A second mobile communication apparatus also located within the wireless communication coverage is in a standby period under an idle mode. The first mobile communication apparatus comprises a wireless communication module which establishes a communication link with the control apparatus, and a P2P transceiving module which communicates through the second mobile communication apparatus with the control apparatus via a P2P communication mechanism.

In practice, the P2P transceiving module receives a power-on status of the second mobile communication apparatus from the second mobile communication apparatus via the P2P communication mechanism, and transmits the power-on status to the control apparatus to inform the control apparatus that the second mobile communication apparatus is at a power-on state. Further, since a communication link is established between the first wireless communication apparatus and the control apparatus, the wireless communication module is capable of receiving an incoming call indication from the second mobile communication apparatus, and the P2P transceiving module then transmits the incoming call indication to the second mobile communication apparatus via the P2P communication mechanism.

Therefore, according to the wireless communication system of the present disclosure, all mobile communication apparatuses within a wireless communication coverage of a base station of the wireless communication system, apart from communicating with the base station compliant with an original communication protocol, also serve as bridges for one another to communicate with the base station via a P2P communication mechanism. Through such cooperative approach of the mobile communication apparatuses, the wireless communication system and an operating method thereof are capable of significantly extending a standby period under an idle mode of the mobile communication apparatuses and effectively reducing power consumption under the idle mode of the mobile communication apparatuses, so as to prolonging a total standby time of the mobile communication apparatuses to accomplish one of the objectives of the present disclosure.

BRIEF DESCRIPTION OF THE DRAWINGS

The present disclosure will become more readily apparent to those ordinarily skilled in the art after reviewing the following detailed description and accompanying drawings, in which:

FIG. 7A is a timing diagram illustrating a relationship between an incoming message time point Tc and a timing point Tr at which the first mobile communication apparatus receives the incoming message under a condition shown in FIG. 6A.

FIG. 7B and FIG. 7C are timing diagrams illustrating relationships between an incoming message time point Tc and a timing point Tr' at which the first mobile communication apparatus receives the incoming message under a condition shown in FIG. 6C.

DETAILED DESCRIPTION OF THE PREFERRED EMBODIMENT

It is an objective of the present disclosure to provide a wireless communication system and a mobile communication apparatus capable of reducing power consumption of the mobile communication apparatus under an idle mode as well as lengthening a total standby time of the mobile communication apparatus by implementing a P2P communication mechanism, and an operating method thereof.

Figure 1:
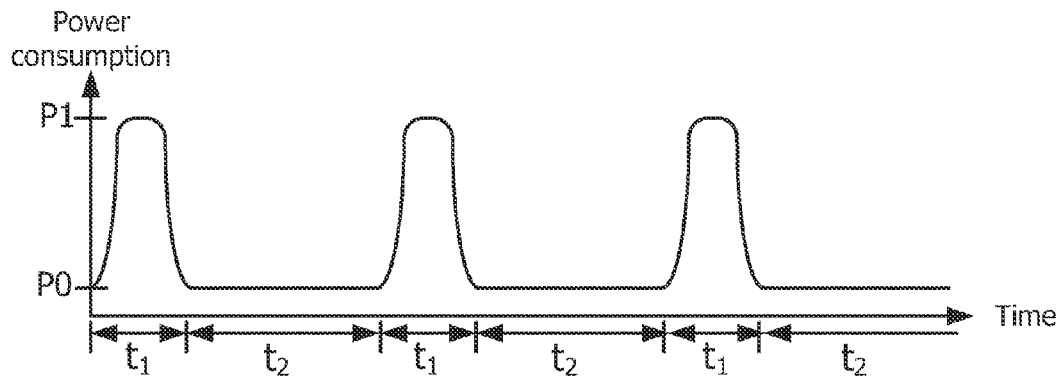
FIG. 1 is a timing diagram illustrating a relationship between time and power consumption of a conventional mobile communication apparatus under an idle mode.
Figure 2:
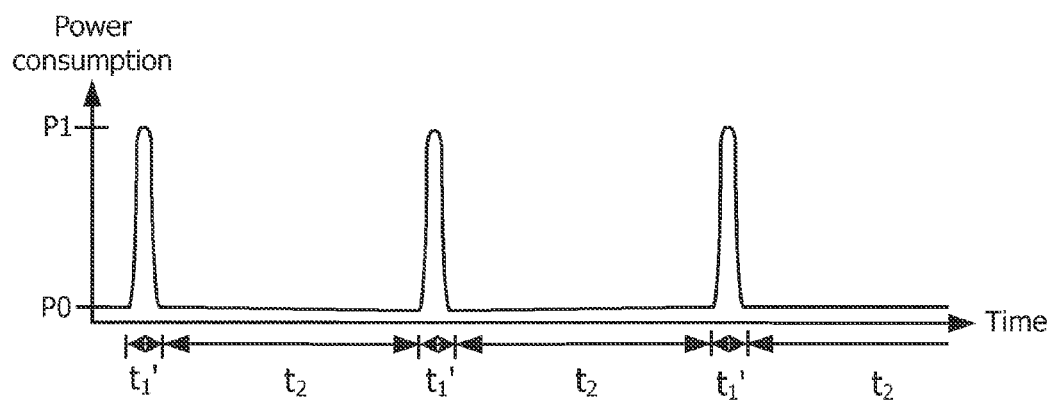
FIGS. 2 and 3 are timing diagrams respectively illustrating approaches of shortening an active period and reducing a power consumption peak during an active period for reducing power consumption of a mobile communication apparatus under an idle mode in the prior art.
Figure 3:
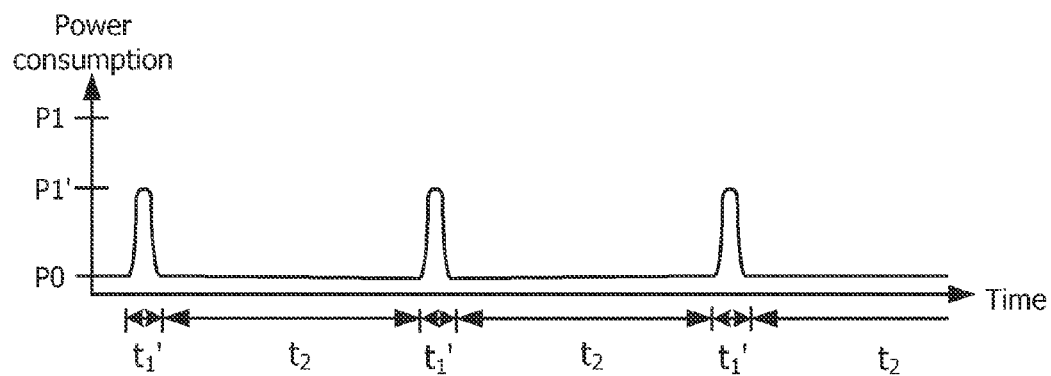
Figure 4A:
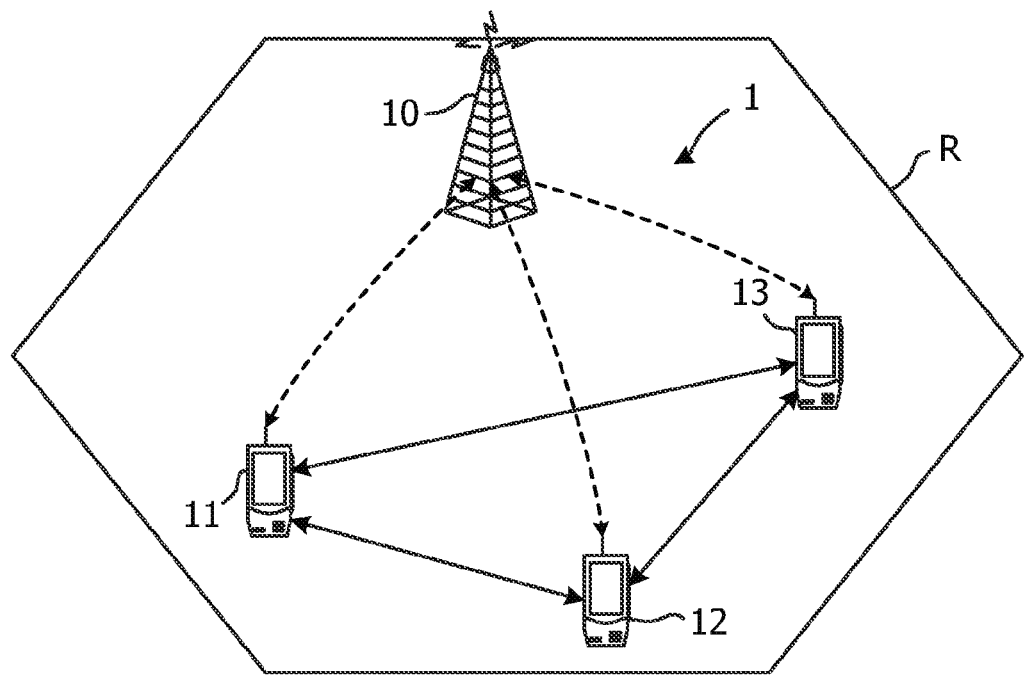
FIG. 4A is a schematic diagram of a wireless communication system according to the present disclosure.

According to a first embodiment of the disclosure, a wireless communication system is provided and described with reference to FIG. 4A through FIG. 4D. FIG. 4A shows a schematic diagram of the wireless communication system 1. As shown, the wireless communication system 1 comprises a control apparatus 10, a first mobile communication apparatus 11, a second mobile communication apparatus 12 and a third mobile communication apparatus 13. The first mobile communication apparatus 11, the second mobile communication apparatus 12 and the third mobile communication apparatus 13 are within a wireless communication coverage R of the control apparatus 10. The number of mobile communication apparatuses comprised by the wireless communication system 1 and a range of the wireless communication coverage R of the control apparatus 10 is not limited to the example given in this embodiment, and can be determined according to actual needs.

In practice, the control apparatus 10 is a wireless mobile communication base station, for example. Supposing the first mobile communication apparatus 11, the second mobile communication apparatus 12 and the third mobile communication apparatus 13 use wireless mobile communication services from the same carrier, the control apparatus 10 is then capable of providing base station services to the first mobile communication apparatus 11, the second mobile communication apparatus 12 and the third mobile communication apparatus 13. More specifically, when the first mobile communication apparatus 11, the second mobile communication apparatus 12 and the third mobile communication apparatus 13 are powered on and are in a talk mode or an active period under an idle mode compliant with a wireless communication protocol, the first mobile communication apparatus 11, the second mobile communication apparatus 12 and the third mobile communication apparatus 13 respectively establish communication links (shown by dotted lines) with the control apparatus 10 via the wireless communication protocol.

Again referring to FIG. 4A, apart from being able to communicate with the control apparatus 10 through respective communication links, the first mobile communication apparatus 11, the second mobile communication apparatus 12 and the third mobile communication apparatus 13 are also capable of directly communicating with one another via a P2P communication mechanism (shown by solid lines). Taking the second mobile communication apparatus 12 for example, upon establishing a communication link with the control apparatus 10, the second mobile communication apparatus 12 also transmits a list of neighboring mobile communication apparatuses capable of communicating via the P2P communication mechanism with the second mobile communication apparatus 12 to the control apparatus 10.

Figure 4B:
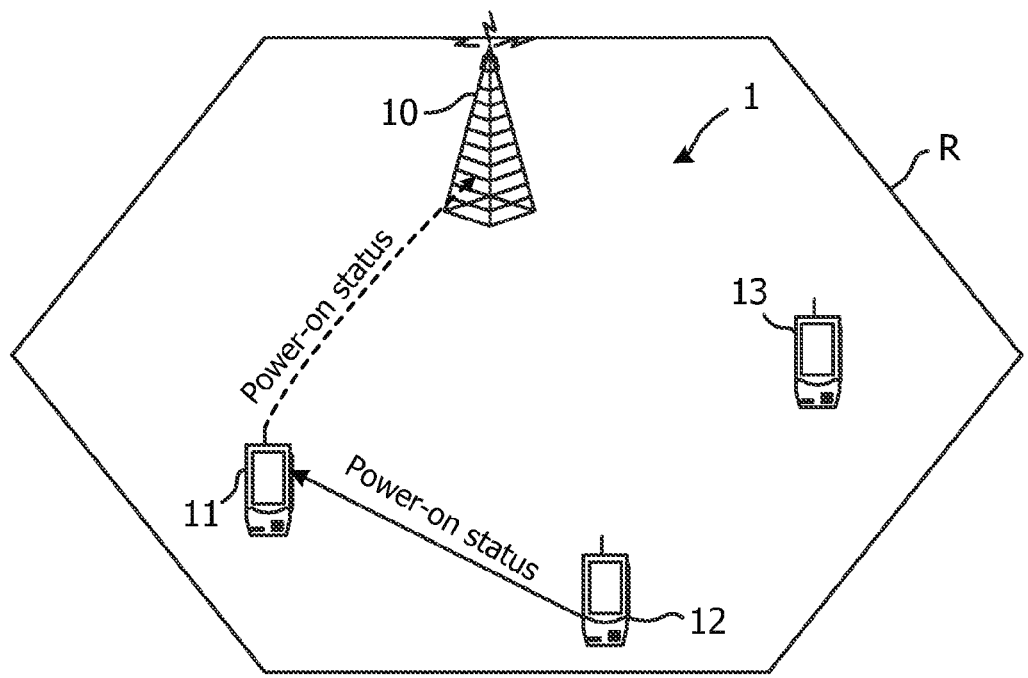
FIG. 4B is a schematic diagram illustrating a second mobile communication apparatus transmitting a power-on status through a first mobile communication apparatus to a control apparatus according to the present disclosure.

With reference to FIG. 4B, supposing the first mobile communication apparatus 11 is in an active period under an idle mode and the second mobile communication apparatus 12 is in a standby period under an idle mode, and the first mobile communication apparatus 11 but not the second mobile communication apparatus 12 establishes a communication link with the control apparatus 10. At this point, the second mobile communication apparatus 12, via the P2P communication mechanism, transmits a power-on status signal of the second mobile communication apparatus 12 to the first mobile communication apparatus 11. The first mobile communication apparatus 11 then transmits the power-on status signal to the control apparatus 10, so that the control apparatus 10 is informed that the second mobile communication apparatus 12 is powered on. That is to say, the second mobile communication apparatus 12, via the P2P communication mechanism, communicates with the control apparatus 10 through the first mobile communication apparatus 11.

Figure 4C:
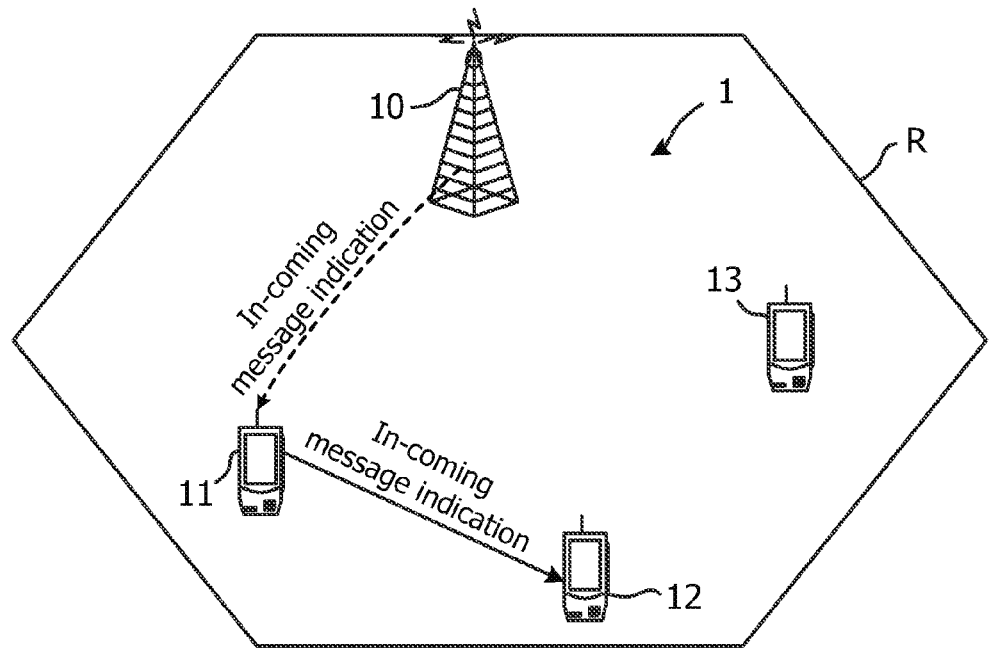
FIG. 4C is a schematic diagram illustrating the control apparatus transmitting an incoming message indication through the first mobile communication apparatus to the second mobile communication apparatus.
Figure 4D:
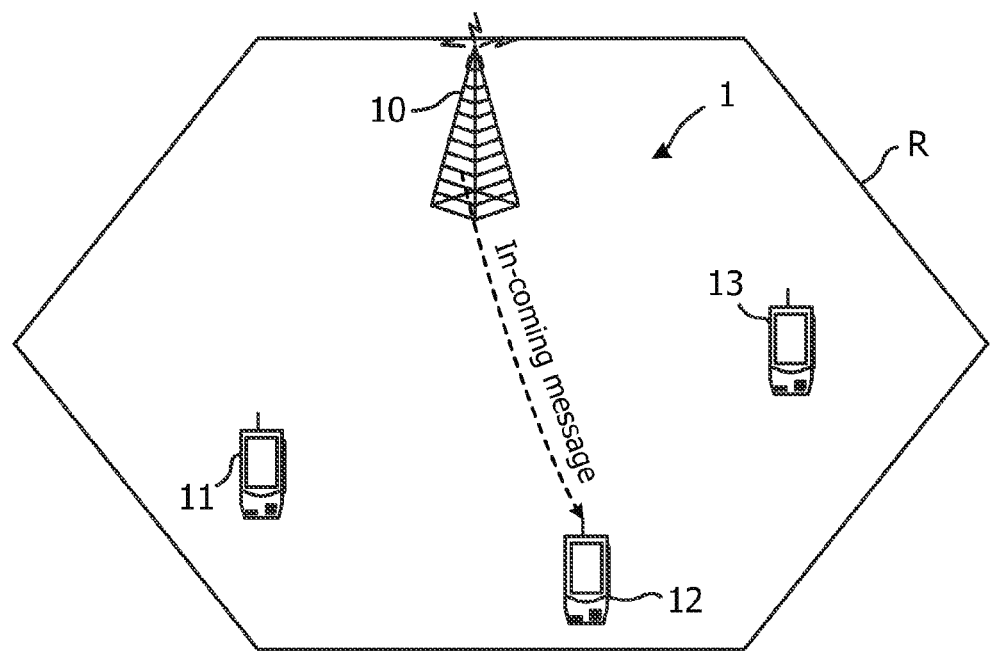
FIG. 4D is a schematic diagram illustrating the second mobile communication apparatus activating a receiving terminal thereof for receiving an incoming message from the control apparatus.

Referring to FIG. 4C, the second mobile communication apparatus 12 is incapable of directly receiving incoming messages from the control apparatus 10 when a communication link is not established therewith. At this point, the control apparatus 10 first transmits an incoming message indication for an incoming message intended for the second mobile communication apparatus 12 to the first mobile communication apparatus 11, which forwards the incoming message indication to the second mobile communication apparatus 12. Upon receiving the incoming message indication, the second mobile communication apparatus 12 immediately activates a receiving terminal thereof to receive the incoming message from the control apparatus 10, as shown in FIG. 4D.

Structural details of the various mobile communication apparatuses of the wireless communication system 1 shall be given below by taking the first mobile communication apparatus 11 as an example. Structures of the second and third mobile communication apparatuses 12 and 13 are substantially the same as that of the first mobile communication apparatus 11, and shall not be further discussed in the interest of brevity.

Figure 5:
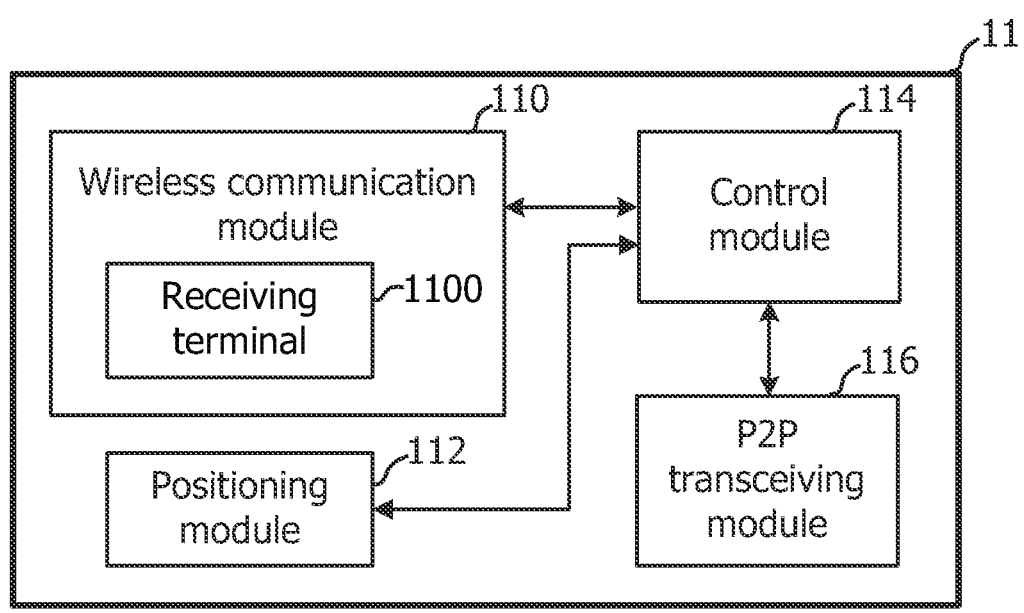
FIG. 5 is a functional block diagram of the first mobile communication apparatus in FIG. 4A.

FIG. 5 shows a functional block diagram of the first mobile communication apparatus 11. As shown in FIG. 5, the first mobile communication apparatus 11 comprises a wireless communication module 110, a positioning module 112, a control module 114 and a P2P transceiving module 116. The wireless communication module 110 comprises a receiving terminal 1100. The wireless communication module 110, the positioning module 112 and the P2P transceiving module 116 are respectively coupled to the control module 114.

In this embodiment, the wireless communication module 110 is in charge of wireless communication audio/data reception and transmission of the first mobile communication apparatus 11. In practice, the wireless communication protocols that the wireless communication module 110 follows may be wireless communication protocols ranging from, for example, common 2G mobile telecommunication technologies and wireless LAN, to 3G mobile telecommunication technologies including Worldwide Interoperability for Microwave Access (WiMAX), 3.5G mobile telecommunication technologies including High Speed Downlink Packet Access (HSPDA), and 4G mobile telecommunication technologies including Long-term Evolution (LTE).

In this embodiment, the positioning module 112 receives from a satellite positioning system location-related information of the first mobile communication apparatus 11 and detects through a dynamic sensor to determine whether the first mobile communication apparatus 11 is in motion. Through the wireless communication module 110, the positioning module 112 then transmits location information and motion information to the control apparatus 10, so as to allow the control apparatus 10 to correctly learn a current location of the first mobile communication apparatus 11 or whether the first mobile communication apparatus 11 is in motion. Accordingly, it may be determined whether the control apparatus 10 needs only to inform the first mobile communication apparatus 11 of incoming messages during communication between the first mobile communication apparatus 11 under an active period and the control apparatus 10.

In practice, the satellite positioning system may be, for example, Global Positioning System (GPS), Assisted Global Positioning System (AGPS), Global Navigation Satellite System (GLONASS), and Galileo satellite positioning system.

In this embodiment, the control module 114 is in charge of switching between different wireless communication modes implemented by the wireless communication module 110 of the first mobile communication apparatus 11. For example, supposing the wireless communication module 110 supports both 2G and 3G, which are both operative under communication circumstances provided by the wireless communication system 1. At this point, the control module 114 selects between the 2G and 3G modes to adopt the one with less power consumption when under an idle mode.

Further, the control module 114 is also in charge of timing of the first mobile communication apparatus 11. In practice, the control module 114 usually comprises a counter with a frequency of 32.768 KHz. After determining which wireless mobile communication mode is to be used by the wireless communication module 110, according to a count of the counter, the control module 114 informs the wireless communication module 110 under an idle mode when to enter a standby period and when to enter an active period.

It is to be noted that, respective communications between the P2P transceiving module 116 of the first mobile communication apparatus 11 and the second mobile communication apparatus 12 and the third mobile communication apparatus 13 may be, for example, data transmissions. In practice, power consumption of the P2P transceiving module 116 under an idle mode is far less than power consumption of the wireless communication module 110 under an idle mode. In addition, the P2P communication mechanism adopted by the P2P transceiving module 116 may be Bluetooth, Wibree, and RFID communication mechanisms, any other communication mechanism suitable for communications between mobile communication apparatuses, or a combination thereof.

Figure 6A:
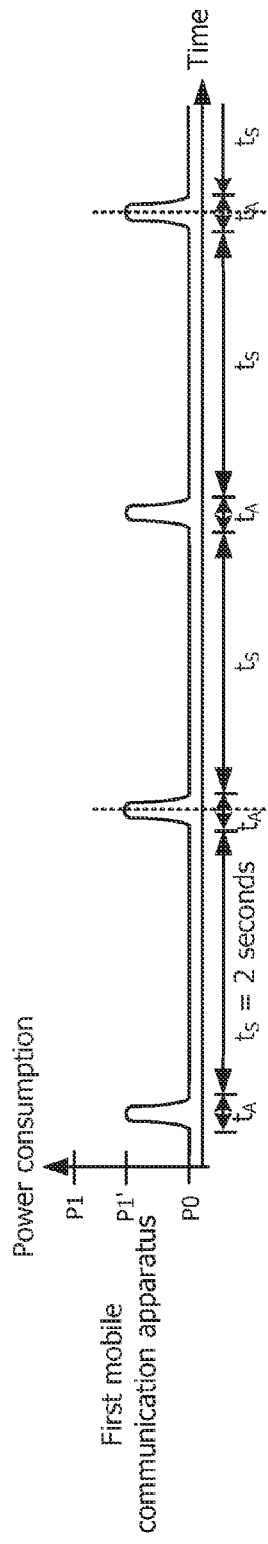
FIG. 6A is a timing diagram illustrating a relationship between power consumption of the first mobile communication apparatus and time when a standby period $t_S$ of the first mobile communication apparatus equals 2 seconds.
Figure 6B:
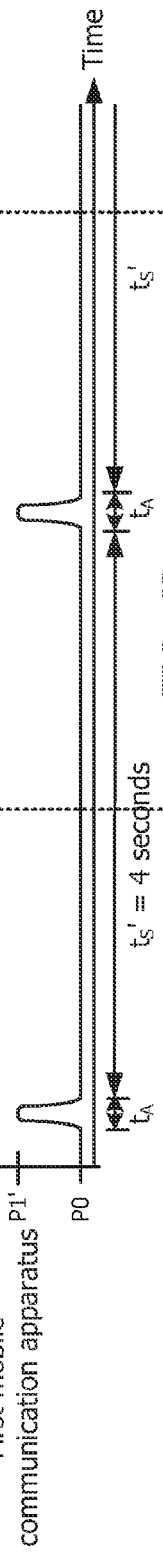
FIG. 6B is a timing diagram illustrating a relationship between power consumption of the first mobile communication apparatus and time when a standby period $t_S'$ of the first mobile communication apparatus is extended from $t_S$ of 2 seconds to 4 seconds.
Figure 6C:
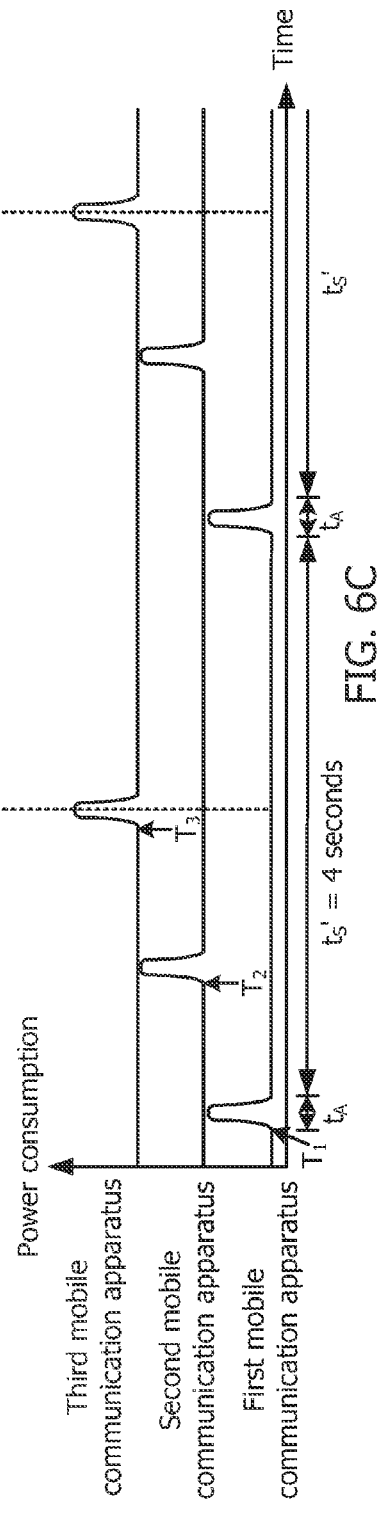
FIG. 6C is a timing diagram illustrating a distribution of active periods of the first, second and a third mobile communication apparatuses, with standby periods of the three all being $t_S'$=4 seconds.

Details of the above operations shall be given with an actual example below, with reference to FIGS. 6A to 6C. FIG. 6A shows a timing diagram of a relationship between power consumption of the first mobile communication apparatus 11 and time when a standby period $t_S$ of the first mobile communication apparatus 11 equals 2 seconds. FIG. 6B shows a timing diagram of a relationship between power consumption of the first mobile communication apparatus 11 and time when a standby period $t_S'$ of the first mobile communication apparatus 11 is extended from $t_S$ of 2 seconds to 4 seconds. FIG. 6C shows a timing diagram of a distribution of active periods of the first mobile communication apparatus 11, the second mobile communication apparatus 12 and the third mobile communication apparatus 13, with standby periods of the three all being $t_S'=4$ seconds.

As shown in FIG. 6A, suppose the first mobile communication apparatus 11 is originally under an idle mode with a standby period of $t_S=2$ seconds and an active period of $t_A$, wherein $t_S$ is far greater than $t_A$. In this embodiment, a power consumption peak P1 is reduced to P1' since the control module 114 of the first mobile communication apparatus 11 already chose a wireless mobile communication mode with less power consumption under an idle mode.

Referring to FIG. 6B, in order to further reduce total power consumption of the first mobile communication apparatus 11 under an idle mode, a standby period of the first mobile communication apparatus 11 under an idle mode is extended from $t_S=2$ seconds to $t_S'=4$ seconds. In a conventional wireless communication system, such approach of simply extending a standby period causes side-effects that a mobile communication apparatus shall be delayed in being informed about incoming calls and hence a caller shall also wait for a longer period before the call is connected through. However, in the wireless communication system 1 according to the present disclosure, the above drawback of the prior art is eliminated.

Referring to FIG. 6C, the first mobile communication apparatus 11, the second mobile communication apparatus 12 and the third mobile communication apparatus 13 have the same standby period of $t_S'=4$ seconds, and the same active period of $t_A$. As depicted in FIG. 6C, the first mobile communication apparatus 11, the second mobile communication apparatus 12 and the third mobile communication apparatus 13, under an idle mode, respectively start activating the active period $t_A$ at different activating time points $T_1$, $T_2$ and $T_3$. More specifically, for the first mobile communication apparatus 11, the second mobile communication apparatus 12 and the third mobile communication apparatus 13, the activating time points $T_1$, $T_2$ and $T_3$ that start the active period are staggered and do not take place simultaneously.

In practice, the activating time points and the duration of the standby period of the first mobile communication apparatus 11, the second mobile communication apparatus 12 and the third mobile communication apparatus 13 are determined by an automatically scheduled result generated by the control apparatus 10 according to associated information provided by the first mobile communication apparatus 11, the second mobile communication apparatus 12 and the third mobile communication apparatus 13, and may be further adjusted according to the scheduled result.

FIG. 7A shows a timing diagram of a relationship between an incoming message time point Tc and a timing point Tr that the first mobile communication apparatus 11 receives the incoming message under a condition shown in FIG. 6A. FIG. 7B and FIG. 7C show timing diagrams of a relationship between an incoming message time point Tc and a timing point Tr' that the first mobile communication apparatus 11 receives the incoming message under a condition shown in FIG. 6C.

As shown in FIG. 7A, under the condition in FIG. 6A, suppose the control apparatus 10 receives from the wireless communication network at the time point Tc an incoming message intended for the first mobile communication apparatus 11. However, since the first mobile communication apparatus 11 needs to wait until the time point Tr to enter an active period in order to communicate with the control apparatus 10, the first mobile communication apparatus 11 then necessarily waits until the time point Tr to receive the incoming message.

To improve the above situation, as shown in FIG. 7B, under the condition in FIG. 6C, although a respective standby period of each of the first mobile communication apparatus 11, the second mobile communication apparatus 12 and the third mobile communication apparatus 13 is extended from $t_S=2$ seconds to $t_S'=4$ seconds, the activating time points of the first mobile communication apparatus 11, the second mobile communication apparatus 12 and the third mobile communication apparatus 13 are staggered. Similar to FIG. 7A, suppose the control apparatus 10 also receives from a wireless communication network at the time point Tc an incoming message intended for the first mobile communication apparatus 11. At this point, as shown in FIG. 7C, the second mobile communication apparatus 12 also enters an active period $t_A$ at the time point Tc; that is, during a communicating period of the second mobile communication apparatus 12, the control apparatus 10 receives from the wireless network the incoming message intended for the first mobile communication apparatus 11.

However, at this point, the first mobile communication apparatus 11, being still under a standby period, is incapable of establishing a link with the control apparatus 10. Thus, the control apparatus 10 employs the communication link established with the second mobile communication apparatus 12 to transmit an incoming message indication corresponding to the incoming message to the second mobile communication apparatus 12, and requests the second mobile communication apparatus 12 to forward the incoming message indication to the first mobile communication apparatus 11. Upon receiving the incoming message indication, the second mobile communication apparatus 12 forwards via the P2P transceiving module thereof to the P2P transceiving module 116 of the first mobile communication apparatus 11.

When the P2P transceiving module 116 of the first mobile communication apparatus 11 receives the incoming message indication at the time point Tr', the control module 114 immediately activates the receiving terminal 1100 of the wireless communication module 110 according to the incoming message indication. In practice, the incoming message may be a message in any form, e.g., a text message, a voice message, a data message, a multimedia message or an interrupt signal. The incoming message indication corresponding to the incoming message is, for example, an indication signal, which informs the first mobile communication apparatus 11 to immediately activate the receiving terminal 1100 of the wireless communication module 110 to receive the incoming message. As shown in FIG. 7C, the time point Tr' at which the first mobile communication apparatus 11 receives the incoming message is sooner than the time point Tr at which the first mobile communication apparatus 11 receives the incoming message in FIG. 7A, with a difference between the two time points expressed as $\Delta T=Tr-Tr'$. Therefore, through a cooperative scheme between the mobile communication apparatuses according to the present disclosure, the first mobile communication apparatus 11 is allowed to receive the incoming message by a time of $\Delta T$ ahead compared to the prior art, so that the drawback of a mobile communication apparatus being delayed in receiving an incoming message due to extension of a standby period of the mobile communication apparatus is eliminated.

It is to be noted that, since a mobile communication apparatus may be powered off or move to other locations, the control apparatus 10 updates the mobile communication apparatus with the latest information whenever the mobile communication apparatus establishes a communication link with the control apparatus 10. Further, as the number of mobile communication apparatuses increases, the control apparatus 10 may make adjustments to standby periods and active periods of different mobile communication apparatuses to obtain optimal communication efficiency. More specifically, when the number of mobile communication apparatuses gets large enough, even if when one of the mobile communication apparatuses is in a standby period with no communication link established with the control apparatus 10, the mobile communication apparatus, via receiving the incoming message through one or more other communication apparatuses, is still capable to in real-time receive an incoming message by immediately activating a communication link with the control apparatus 10.

Figure 8:
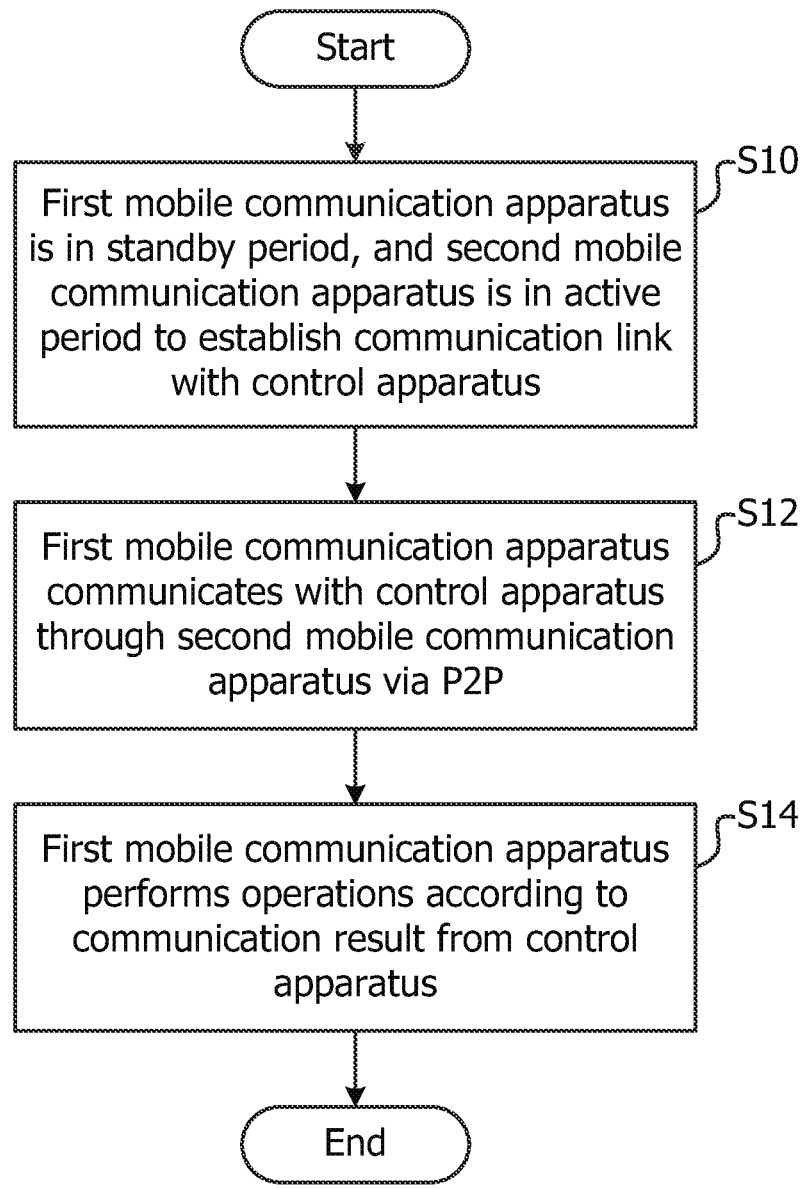
FIG. 8 is a flowchart of a method for operating a wireless communication system according to the present disclosure.

According to a second embodiment of the present disclosure, a method for operating a wireless communication system is provided. In this embodiment, the wireless communication system comprises a control apparatus, a first mobile communication apparatus and a second mobile communication apparatus. The first mobile communication apparatus and the second mobile communication apparatus are within a wireless communication coverage of the control apparatus. FIG. 8 shows a flowchart of the method for operating the wireless communication system.

As shown in FIG. 8, at Step S10, the first mobile communication apparatus is in a standby period under an idle mode compliant with a wireless communication protocol, and the second mobile communication apparatus is in an active period under an idle mode to establish a communication link with the control apparatus. At Step S12, the first mobile communication apparatus communicates with the control apparatus through the second mobile communication apparatus via a P2P communication mechanism. At Step S14, the first mobile communication apparatus, in response to a communication result from the control apparatus, performs an operation, e.g., entering an active period and immediately activates a receiving terminal thereof to receive an incoming message from the control apparatus.

Figure 9:
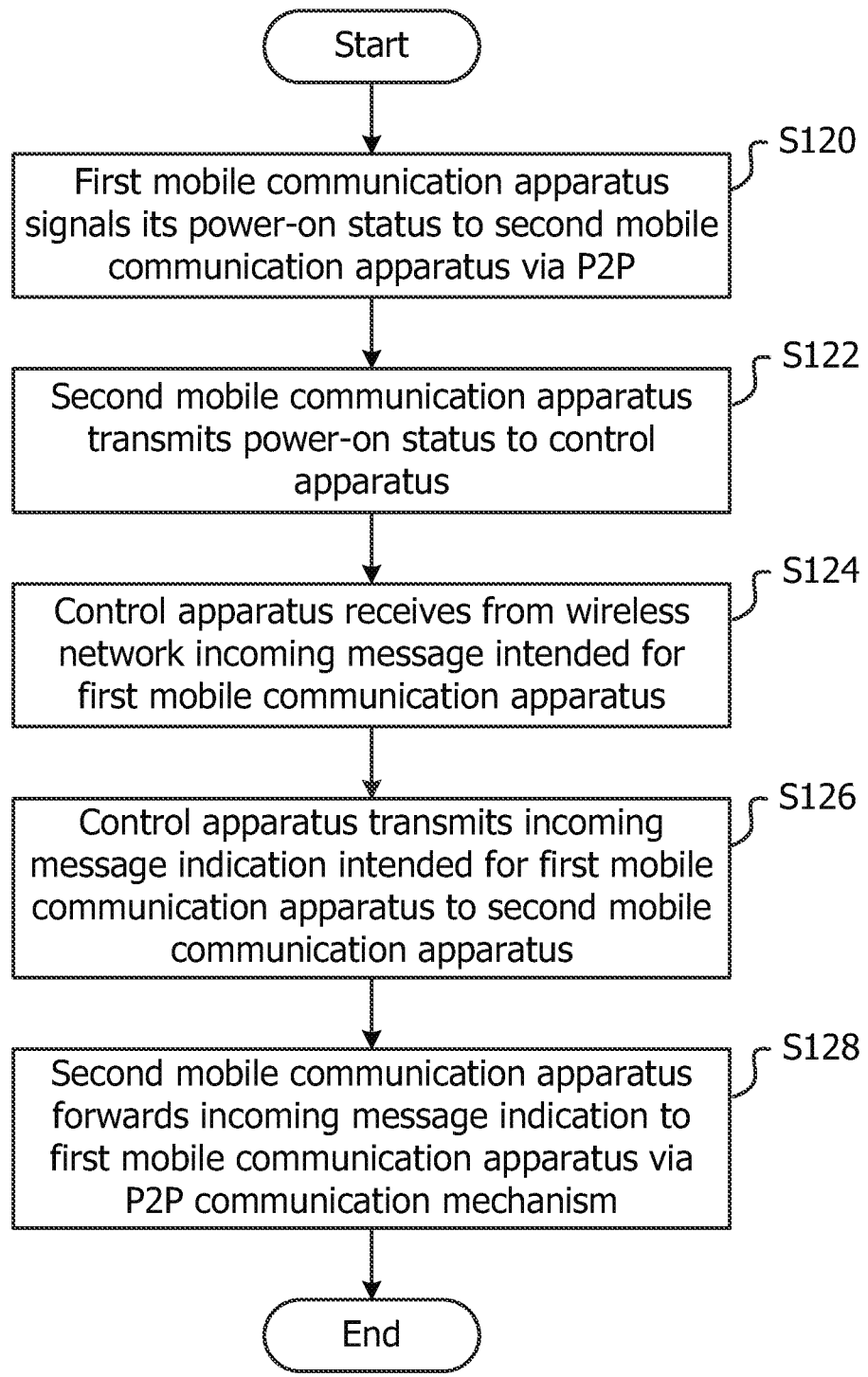
FIG. 9 is a detailed flowchart of Step S12 in FIG. 8 according to the present disclosure.

Referring to FIG. 9, which shows a detailed flowchart of Step S12, of which Steps S120 to S128 being sub-steps. At Step S120, the first mobile communication apparatus informs the second mobile communication apparatus of a power-on status signal of the first mobile communication apparatus via the P2P communication mechanism. At Step S122, the second mobile communication apparatus transmits the power-on status signal to the control apparatus. Thereby, although the first mobile communication apparatus is not in an active period, the control apparatus is still able to learn through the second mobile communication apparatus that the first mobile communication apparatus is powered on.

At Step S124, before or when the second mobile communication apparatus communicates with the control apparatus, the control apparatus receives from a wireless communication network an incoming message intended for the first mobile communication apparatus. At this point, the first mobile communication apparatus is temporarily incapable of learning of the incoming message due to that a communication link with the control apparatus is not established. Thus, at Step S126, the control apparatus transmits an incoming message indication corresponding to the incoming message to the second mobile communication apparatus. At Step S128, the second mobile communication apparatus forwards via the P2P communication mechanism the incoming message indication to the first mobile communication apparatus.

In practice, the incoming message may be a message in any form, e.g., a text message, a voice message, a data message, a multimedia message or an interrupt signal. The control apparatus may be, e.g., a wireless mobile communication base station. Upon receiving associated messages responded from the various mobile communication apparatuses with respective established communication links, the control apparatus generates a schedule result from a distribution of active periods of the various mobile communication apparatuses. The associated messages may contain information of, for example, messages indicating with which mobile communication apparatuses a certain mobile communication apparatus is capable of communicating via the P2P transmission, and current standby period and activating time point of each of the mobile communication apparatuses. The control apparatus then transmits the schedule result to the various mobile communication apparatuses, which adjust standby periods and active periods thereof according to the schedule result to prevent an issue in the prior art of being delayed in receiving incoming messages due to extension of standby periods.

According to a third embodiment of the present disclosure, a first mobile communication apparatus is provided. The first mobile communication apparatus is within a wireless communication coverage of a control apparatus of a wireless communication system, and comprises a wireless communication module, a positioning module, a control module and a P2P transceiving module. The wireless communication module comprises a receiving terminal. Functions and operations of the first mobile communication apparatus are as disclosed in FIG. 5 and abovementioned description, and shall not be further discussed.

In this embodiment, the first mobile communication apparatus is in a standby period under an idle mode compliant with a wireless communication protocol, and a second mobile communication apparatus is in an active period under an idle mode compliant with the wireless communication protocol to establish a communication link with the control apparatus. It is to be noted that, although the first mobile communication apparatus is in a standby period under an idle mode, it is still capable of communicating via the P2P transceiving module thereof with the control apparatus through the second mobile communication apparatus by implementing the P2P communication mechanism.

For example, since the first mobile communication apparatus, being under a standby period under an idle mode, is incapable of directly communicating with the control apparatus via the wireless communication module thereof, the P2P transceiving module of the first mobile communication apparatus is nevertheless capable of informing the second mobile communication apparatus of a power-on status signal of the first mobile communication apparatus by implementing the P2P communication mechanism. The second mobile communication apparatus then transmits the power-on status to the control apparatus to inform the control apparatus that the first mobile communication apparatus is powered on.

Further, since the first mobile communication apparatus is in a standby period under an idle mode, the control apparatus is unable to directly transmit an incoming message indication corresponding to an incoming message to the first mobile communication apparatus. However, by taking the advantage of a communication link established between the control apparatus and the second mobile communication apparatus, the control apparatus first transmits the incoming message indication to the second mobile communication apparatus, which then forwards the incoming message indication to the P2P transceiving module of the first mobile communication apparatus by implementing the P2P communication mechanism. When the P2P transceiving module receives the incoming message indication, the control module of the first mobile communication apparatus immediately activates the receiving terminal thereof to receive the incoming message from the control apparatus.

In practice, the standby periods of the first mobile communication apparatus and the second mobile communication apparatus may be adjusted according to an active period distribution of the first mobile communication apparatus and the second mobile communication apparatus. The P2P communication mechanism adopted by the P2P transceiving module 116 may be Bluetooth, Wibree, and RFID communication mechanisms, or any other communication mechanism suitable for communications between mobile communication apparatuses.

With the embodiments of the present disclosure, it is easily appreciated that, in the wireless communication system according to the disclosure, apart from communicating via an existing communication protocol with a base station, all mobile communication apparatuses within a wireless communication coverage of the base station of the wireless communication system are also capable of serving one another as bridges for communicating with the base station by implementing a P2P communication mechanism. Therefore, standby periods under an idle mode are significantly extended to effectively reduce power consumption of the mobile communication apparatuses under an idle mode, so as to prolong a total standby time of the mobile communication apparatus.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless communication system, comprising:
a control apparatus having a wireless communication coverage;
a first mobile communication apparatus being in a standby period compliant with a wireless communication protocol; and
a second mobile communication apparatus being in an active period compliant with the wireless communication protocol to establish a communication link with the control apparatus,
wherein the first and second mobile communication apparatuses are within the wireless communication coverage of the control apparatus, the first mobile communication apparatus communicating through the second mobile communication apparatus with the control apparatus via a peer-to-peer (P2P) communication mechanism, and
wherein lengths of standby periods of the first and second mobile communication apparatuses are adjusted by the control apparatus according to a distribution of active periods of the first and second mobile communication apparatuses.

2. The wireless communication system as claimed in claim 1, wherein the control apparatus is a base station.

3. The wireless communication system as claimed in claim 1, wherein the first mobile communication apparatus signals the second mobile communication apparatus to indicate a power-on status of the first mobile communication apparatus via the P2P communication mechanism, wherein the second mobile communication apparatus informs the control apparatus that the first mobile communication apparatus is powered on, and wherein the control apparatus communicates to the first mobile communication apparatus through the second mobile communication apparatus.

4. The wireless communication system as claimed in claim 1, wherein when the communication link is established between the second mobile communication apparatus and the control apparatus, the control apparatus transmits to the second mobile communication apparatus an incoming message indication corresponding to an incoming message intended for the first mobile communication apparatus, wherein the second mobile communication apparatus forwards the incoming message indication to the first mobile communication apparatus via the P2P communication mechanism, and wherein the first mobile communication apparatus activates a receiving terminal in response to receiving the incoming message indication to receive the incoming message from the control apparatus.

5. The wireless communication system as claimed in claim 1, wherein the P2P communication mechanism adopted by the first mobile communication apparatus and the second mobile communication apparatus comprises a Bluetooth communication mechanism, a Wibree communication mechanism, a radio frequency identification (RFID) communication mechanism, or a combination thereof.

6. The wireless communication system as claimed in claim 1, wherein the first mobile communication apparatus and the second mobile communication apparatus individually comprise a respective P2P transceiving module through which the first mobile communication apparatus and the second mobile communication apparatus communicate with each other to form a P2P network.

7. The wireless communication system as claimed in claim 6, wherein standby power consumption of the P2P transceiving module is smaller than power consumption of wireless communication modules of the first and second mobile communication apparatuses.

8. The wireless communication system as claimed in claim 1, wherein when the second mobile communication apparatus establishes the communication link with the control apparatus, the second mobile communication apparatus provides to the control apparatus a list of neighboring mobile communication apparatuses capable of communicating with the second mobile communication apparatus via the P2P communication mechanism.

9. The wireless communication system as claimed in claim 1, wherein the first mobile communication apparatus is in the standby period under an idle mode, and the second mobile communication apparatus is in the active period under the idle mode.

10. A method for operating a wireless communication system, the method comprising:
    placing a first mobile communication apparatus in a standby period compliant with a wireless communication protocol;
    rendering communication between the first mobile communication apparatus and a control apparatus of the wireless communication system in part via a peer-to-peer (P2P) communication mechanism; and
    transmitting, from the first mobile communication apparatus to a second mobile communication apparatus via the P2P communication mechanism, a signal indicative of a power-on status for the second communication apparatus to inform the control apparatus that the first mobile communication apparatus is powered on,
    wherein lengths of standby periods of the first and second mobile communication apparatuses are adjusted by the control apparatus according to a distribution of active periods of the first and second mobile communication apparatuses.

11. The method as claimed in claim 10, wherein rendering communication between the first mobile communication apparatus and a control apparatus of the wireless communication system in part via a P2P communication mechanism comprises:
    establishing a communication link between the first mobile communication apparatus and a second mobile communication apparatus using the P2P communication mechanism, the second mobile communication apparatus in an active period compliant with the wireless communication protocol and having a communication link with the control apparatus.

12. The method as claimed in claim 10, wherein the P2P communication mechanism comprises Bluetooth, Wibree, radio-frequency identification (RFID), or a combination thereof.

13. The method as claimed in claim 10, further comprising:
    receiving, by the first mobile communication apparatus from a second mobile communication apparatus via the P2P communication mechanism, a signal forwarded from the control apparatus to the second mobile communication apparatus that is indicative of an incoming message intended for the first mobile communication apparatus.

14. The method as claimed in claim 13, further comprising:
    the first mobile communication apparatus activating a receiving terminal thereof according to the signal to receive the incoming message from the control apparatus, wherein the incoming message is received through the second mobile communication apparatus.

15. The method as claimed in claim 10, further comprising:
    receiving at the first mobile communication apparatus location-related information from a satellite positioning system.

16. A mobile communication apparatus, comprising:
    a wireless communication module that communicates with a control apparatus; and
    a peer-to-peer (P2P) transceiving module coupled to the wireless communication module to communicate under an idle mode with another mobile communication apparatus via a P2P communication mechanism,
    wherein the P2P transceiving module receives from the another mobile communication apparatus a power-on status of the another mobile communication apparatus via the P2P communication mechanism,
    wherein the wireless communication module communicates to the control apparatus to inform the control apparatus that the another mobile communication apparatus is powered on, and
    wherein lengths of standby periods of the mobile communication apparatus and the another mobile communication apparatus are adjusted by the control apparatus according to a distribution of active periods of the mobile communication apparatus and the another mobile communication apparatus.

17. The mobile communication apparatus as claimed in claim 16, wherein when the wireless communication module establishes a communication link with the control apparatus, the wireless communication module receives from the control apparatus an incoming message indication corresponding to an incoming message intended for the another mobile communication apparatus, wherein the P2P transceiving module forwards the incoming message indication to the another mobile communication apparatus via the P2P communication mechanism.

* * * * *